United States Patent
Vlazny et al.

(10) Patent No.: US 8,033,911 B2
(45) Date of Patent: *Oct. 11, 2011

(54) METHODS AND SYSTEMS FOR CONDUCTING PARI-MUTUEL WAGERS

(75) Inventors: Kenneth A. Vlazny, York, PA (US);
Joseph J. Tracy, Westminster, MD (US);
Victor I. Harrison, Glen Rock, PA (US); Stephen M. Smith, Shrewsbury, PA (US); Mark G. Meyer, New Freedom, PA (US)

(73) Assignee: United Tote Company, Louisville, KY (US)

( * ) Notice: Subject to any disclaimer, the term of this patent is extended or adjusted under 35 U.S.C. 154(b) by 1174 days.

This patent is subject to a terminal disclaimer.

(21) Appl. No.: 10/982,546

(22) Filed: Nov. 5, 2004

(65) Prior Publication Data

US 2005/0124410 A1   Jun. 9, 2005

Related U.S. Application Data

(63) Continuation-in-part of application No. 10/704,533, filed on Nov. 7, 2003, now Pat. No. 7,883,411.

(51) Int. Cl.
*A63F 9/24* (2006.01)
*A63F 13/00* (2006.01)
*G06F 17/00* (2006.01)
*G06F 19/00* (2011.01)

(52) U.S. Cl. ............... 463/25; 463/6; 463/26; 463/27; 463/28; 463/42

(58) Field of Classification Search .......... 463/6, 25–28, 463/42

See application file for complete search history.

(56) References Cited

U.S. PATENT DOCUMENTS

| 5,275,400 | A | * | 1/1994 | Weingardt et al. ............ 463/12 |
| 5,779,547 | A |   | 7/1998 | SoRelle et al. |
| 5,888,136 | A | * | 3/1999 | Herbert ......................... 463/22 |
| 6,152,822 | A |   | 11/2000 | Herbert |

(Continued)

FOREIGN PATENT DOCUMENTS

WO    WO 98/40139    9/1998

(Continued)

OTHER PUBLICATIONS

International Search Report, Mar. 22, 2005, 3 pages.
Web page http://www.lotteryinsider.com/news/thurs.htm, visited Oct. 7, 2004 (1 page).

(Continued)

*Primary Examiner* — Melba Bumgarner
*Assistant Examiner* — Jason Pinheiro
(74) *Attorney, Agent, or Firm* — TraskBritt

(57) ABSTRACT

The present invention provides methods and systems of conducting wagers, such as pari-mutuel wagers. In one exemplary embodiment, an event, such as a horse race, dog race, a combination of races, etc., is identified for which a plurality of bettors may each place at least one wager. Each bettor of the plurality is enabled to provide input regarding at least one portion of their respective at least one wager prior to the event. At least one other portion of each bettor's at least one wager is randomized prior to the event. The wager then comprises the combination of the bettor selected portion and randomized portion. In one exemplary embodiment, the player selected portion may include selecting bettor-preferred participants of the event while the randomly selected portion may include the randomly assigning a finishing order to the player selected participants.

20 Claims, 5 Drawing Sheets

U.S. PATENT DOCUMENTS

| | | | |
|---|---|---|---|
| 6,210,275 B1 * | 4/2001 | Olsen | 463/16 |
| 6,309,307 B1 | 10/2001 | Krause et al. | |
| 6,331,148 B1 | 12/2001 | Krause et al. | |
| 7,172,508 B2 * | 2/2007 | Simon et al. | 463/42 |
| 2002/0065120 A1 | 5/2002 | Lee | |
| 2002/0155885 A1 * | 10/2002 | Shvili | 463/25 |
| 2003/0199315 A1 | 10/2003 | Downes | |
| 2004/0229671 A1 * | 11/2004 | Stronach et al. | 463/6 |
| 2004/0235542 A1 | 11/2004 | Stronach et al. | |

FOREIGN PATENT DOCUMENTS

| | | |
|---|---|---|
| WO | WO 00/25876 | 5/2000 |

OTHER PUBLICATIONS

Swedish webpage and accompanying translation, http://www.atg.se/grunderna/spelskola.jsp?sida=2, visited Dec. 10, 2003 (5 pages).

Swedish webpage and accompanying translation, http://www.atgkampanj.nu/hb/html/html, visited Dec. 10, 2003 (2 pages).

Swedish webpage and accompanying translation, http://www.atg.se/grunderna/attspelapahastarjsp?sida=interbet, visited Dec. 15, 2003 (3 pages).

Swedish webpage and accompanying translation, http://www.atg.se/grundera/attspelapahastar.jsp?sida=harryboy, visited Nov. 24, 2003 (4 pages).

* cited by examiner

| Tier | Number of Correct Matches | Odds | Number of Winners | Price | % of Pool | Liability |
|---|---|---|---|---|---|---|
| 1 | 7 of 7 | 1,744,998 | 1 | 444,974.56 | 15.0 | 444,974.56 |
| 2 | 6 of 7 | 30,401 | 57 | 5,168.11 | 10.0 | 296,650 |
| 3 | 5 of 7 | 1,236 | 1,412 | 420.17 | 20.0 | 593,299 |
| 4 | 4 of 7 | 90 | 19,298 | 46.12 | 30.0 | 889,949 |
| 5 | 3 of 7 | 11 | 158,243 | 4.69 | 25.0 | 741,624 |
| | TOTAL | | 179,011 | | 100.0 | 2,966,497 |

*FIG. 2*

| Tier | Match | Tickets | Odds | Comb.'s | Adjusted Odds | Winners | Pool Share | Pool | Average Prize | Weekly Winners |
|---|---|---|---|---|---|---|---|---|---|---|
| 1 | 10 | 350,000,000,000 | Infinite | | Infinite | | | | | |
| | | 150,000,000,000 | 167,619,550 | 1 | 167,619,550 | 894.88 | | | | |
| | | | | | 556,731,835 | 894.88 | 5.599% | $ 20,996,250,000 | $ 23,462,546.57 | 0.02 |
| 2 | 9 | 350,000,000,000 | 167,619,550 | 1 | 167,619,550 | 2,088.06 | | | | |
| | | 150,000,000,000 | 23,280,493 | 9 | 2,586,721 | 57,988.46 | | | | |
| | | | | | 8,322,718 | 60,076.52 | 1.414% | $ 5,302,500,000 | $ 88,262.43 | 1.24 |
| 3 | 8 | 350,000,000,000 | 23,280,493 | 9 | 2,586,721 | 135,306.41 | | | | |
| | | 150,000,000,000 | 3,233,402 | 36 | 89,817 | 1,670,067.72 | | | | |
| | | | | | 276,951 | 1,805,374.13 | 2.912% | $ 10,920,000,000 | $ 6,048.61 | 37.40 |
| 4 | 7 | 350,000,000,000 | 3,233,402 | 36 | 89,817 | 3,896,824.67 | | | | |
| | | 150,000,000,000 | 449,084 | 84 | 5,346 | 28,057,137.66 | | | | |
| | | | | | 15,648 | 31,953,962.33 | 2.820% | $ 10,575,000,000 | $ 330.94 | 662.00 |
| 5 | 6 | 350,000,000,000 | 449,084 | 84 | 5,346 | 65,466,654.54 | | | | |
| | | 150,000,000,000 | 62,373 | 126 | 495 | 303,017,086.71 | | | | |
| | | | | | 1,357 | 368,483,741.24 | 4.433% | $ 16,623,750,000 | $ 45.11 | 7,634.03 |
| 6 | 5 | 350,000,000,000 | 62,373 | 126 | 495 | 707,039,868.98 | | | | |
| | | 150,000,000,000 | 8,663 | 126 | 69 | 2,181,723,024.28 | | | | |
| | | | | | 173 | 2,888,762,893.26 | 14.142% | $ 53,032,500,000 | $ 18.36 | 59,847.66 |
| 7 | 4 | 350,000,000,000 | 8,663 | 126 | 69 | 5,090,687,056.65 | | | | |
| | | 150,000,000,000 | 1,203 | 84 | 14 | 10,472,270,516.53 | | | | |
| | | | | | 32 | 15,562,957,573.18 | 68.680% | $ 257,550,000,000 | $ 16.55 | 322,424.02 |
| 8 | 0 | 350,000,000,000 | | 1 | | | | | | |
| | | 150,000,000,000 | | 1 | | | 0.000% | $ - | $ - | - |
| | Totals | | | | 26.52 | 18,854,024,515.55 | 100.000% | 375,000,000,000 | | 390,606.37 |

| Match | 7-Races | | 8-Races | | 9-Races | | 10-Races | |
|---|---|---|---|---|---|---|---|---|
| | 5 Tiers | 4 Tiers | 6 Tiers | 5 Tiers | 6 Tiers | 5 Tiers | 7 Tiers | 6 Tiers |
| 10 | | | | | | | $ 18,265,147 | $ 20,000,000 |
| 9 | | | | | | | $ 50,000 | $ 213,813 |
| 8 | | | | | | | $ 2,500 | $ 5,000 |
| 7 | $ 212,985 | $ 250,000 | $ 247,000 | $ 1,514,184 | $ 5,000,000 | $ 5,000,000 | $ 100 | $ 500 |
| 6 | $ 1,500 | $ 2,500 | $ 2,500 | $ 10,000 | $ 36,431 | $ 100,000 | $ 10 | $ 100 |
| 5 | $ 125 | $ 140 | $ 500 | $ 600 | $ 2,500 | $ 2,500 | $ 3 | $ 5 |
| 4 | $ 15 | $ 15 | $ 50 | $ 50 | $ 150 | $ 232 | $ 2 | |
| 3 | $ 2 | | $ 5 | $ 5 | $ 20 | $ 20 | | |
| | | | $ 2 | $ 2 | $ 2 | | | |
| Jackpot Odds | 788,878 | 788,878 | 6,468,800 | 6,468,800 | 53,044,162 | 53,044,162 | 434,962,124 | 434,962,124 |
| Overall Odds | 14.21 | 89.20 | 5.68 | 32.85 | 11.03 | 90.14 | 3.38 | 25.69 |

FIG. 4

METHODS AND SYSTEMS FOR CONDUCTING PARI-MUTUEL WAGERS

CROSS-REFERENCE TO RELATED APPLICATIONS

The present application is a continuation-in-part of U.S. application Ser. No. 10/704,533, filed on Nov. 7, 2003, now U.S. Pat. No. 7,883,411 issued Feb. 8, 2011, entitled METHODS AND SYSTEMS FOR CONDUCTING PARI-MUTUEL WAGERS, the disclosure of which is incorporated by reference herein in its entirety.

BACKGROUND OF THE INVENTION

1. Field of the Invention

The present invention generally relates to pari-mutuel wagering and, more particularly, to methods of conducting such wagering activities including, for example, methods and systems for accepting and pricing pari-mutuel wagers.

2. State of the Art

Pari-mutuel wagering essentially includes the placing of wagers by a plurality of individuals on the outcome of an event, wherein the bettors who place "winning" wagers share the betting pool minus a percentage taken out for the management or administration of the wagering activity. For example, pari-mutuel wagering is often associated with racing (e.g., horses or dogs) wherein individuals may place wagers on one or more aspects of the outcome of the race. These aspects may include, for example, which of the participants (also referred to herein as runners) will win the race, the order in which a plurality of runners will finish the race (e.g., exacta—ordered prediction of first and second place; trifecta—ordered prediction of first, second and third place; superfecta—ordered prediction of first through fourth place; etc.), or a runner finishing within a specified range of positions (e.g., a "show" wager for a given runner to finish in either first, second or third place; or a quinella wager for predicting the first and second place finishers regardless of order).

For those individuals who have placed a winning wager such that their prediction matches an actual event outcome, their payout is determined, in part, by the difficulty of the wager (e.g., a show wager vs. a trifecta wager), in part, by the size of the pool as defined by the total amount of wagers placed for a given event and, in part, the specific wagers made by other bettors. Thus, for example, if a defined prize pool is to be paid out to those wagers that selected runner X as the winner and, for example, 20 individual wagers were placed on runner X to win, the prize pool will be divided among those 20 bettors in proportion to the amount each of the 20 individual bettors wagered on such an outcome.

Pari-mutuel wagering is preferred by some individuals because a wager may be "handicapped" in the sense that a bettor may study different facets of an event to make an educated prediction of the outcome of the event prior to placing their wager. For example, in a horse race, a bettor may review the past performances of the horses, the training histories of the horses, the breeding histories of the horses, which jockeys will be participating and other related information. Consideration of such information enables a bettor to make a more educated prediction regarding the outcome of a race or other event.

Many individuals prefer other types of wagering activities, such as slot machines, purchasing of lottery tickets or other conventional wagering activities offered at a casino or a lottery facility, because they find the act of handicapping a pari-mutuel wager to be complex, difficult and time consuming. Furthermore, often there is a significant period of time between races at racing facilities. Several minutes may pass between the time an individual places a wager on a race and the outcome of the wager is made known. Such is in contrast to casino wagering wherein multiple wagers may be placed and the outcome of each be made known in rapid succession such as with slot machines.

There have been various attempts by pari-mutuel venues to attract the individuals that are more inclined to participate in simpler wagering activities. For example, random wagers, sometimes referred to as "quick picks," have been offered at pari-mutuel venues to satisfy those patrons that prefer simpler wagering activities. Such a random wager may include an appropriately configured wagering terminal that is configured to randomly choose the outcome of the event (e.g., the winning runner of a race) on which the bettor places his or her wager. These wagers are added to the pool of wagers or, in other words, commingled with handicapped wagers that have been placed in regards to the same event. However, those individuals that are placing random wagers, such as a quick-pick type wager, may feel disadvantaged by the fact that other bettors are handicapping their wagers and, therefore, that such other bettors may have a better chance at winning a portion of the wagering pool.

Other attempts to attract new patrons, including those who may not be comfortable in handicapped-style wagering, include, for example, those set forth in U.S. Pat. No. 6,309,307 issued to Krause et al. and U.S. Pat. No. 6,152,822 issued to Herbert.

The Krause et al. patent generally describes a method of incorporating casino game attributes with a pari-mutuel wagering activity. For example, a black jack-style game may be played wherein a bettor wagers on whether the sum of the numbers assigned to the first four runners to finish a race will be closer to 21, without going over, than will the sum of the numbers assigned to the last four runners to finish the race. It is noted that such a scheme is still amenable to a bettor handicapping his or her wager. However, it is believed that incorporation of familiar casino or sports betting themes will entice new patrons to frequent pari-mutuel venues.

The Herbert patent generally describes a method of wagering that includes an activity occurring subsequent to at least one pari-mutuel event and that utilizes the outcome of the one or more pari-mutuel events as a "wagering base" for a slot machine type wagering activity. For example, the win, show, exacta and perfecta results of one or more races are selected to comprise the "wagering" base or, in other words, act as the possible outcomes of a slot machine format wagering activity. The odds that were associated with the selected outcomes of the pari-mutuel wagers (win, show, etc.) may be programmed into an appropriate wagering device or system such that, for example, if the odds of a selected perfecta wager (from a previously run race) were 24 to 1 (i.e., a probability of 0.04), the same probability will be assigned to the selected perfecta wager as a potential outcome of the slot machine-style wagering activity. Outcomes from multiple pari-mutuel events or races may be used to build the wagering base and the actual outcome of a "spin" of the slot machine wagering activity is determined by a random number generator based on the probabilities assigned to the various potential outcomes drawn from the wagering base. It is again noted that the slot machine wagering activity is conducted separately from the pari-mutuel events.

Even with schemes such as described in the above-referenced Krause et al., and Herbert patents, other aspects of pari-mutuel wagering stand in need of improvement. For example, an important factor in attracting patron interest is the size of the probable jackpot that a patron can expect to win. Thus, it is desirable to provide relatively large jackpots and to provide relative predictability in providing such jackpots. However, in conventional pari-mutuel wagering activities, the jackpot is inversely related to the ability of the bettor population to predict the outcome of a given event or series of events. Because the predictability of events varies considerably from one event to another, a pari-mutuel venue has little control over the jackpots offered in association with such events.

In view of the shortcomings in the art, it would be advantageous to provide a method of pari-mutuel wagering that is attractive to a wide variety of patrons, that provides for increased jackpots and provides greater predictability in providing such jackpots. It would also be advantageous to provide a method of placing a pari-mutuel wager with a simplified prediction process such that a given bettor did not perceive a distinct disadvantage relative to another bettor who was relatively accomplished at handicapping wagers.

BRIEF SUMMARY OF THE INVENTION

In accordance with one aspect of the invention, a method of conducting a wagering activity is provided. The method includes identifying an event upon which a plurality of bettors may each place at least one wager. Each bettor of the plurality is enabled to provide input regarding at least one portion of their respective at least one wager prior to the event. At least one other portion of each bettor's at least one wager is randomized prior to the event. The event may include, for example, a race wherein the player selected portion of the at least one wager includes a player selection of at least one participant and where the randomized portion of the at least one wager includes a randomized selection of at least one other participant. The player selected and randomized portions may include other selections or identifications as set forth in greater detail below herein.

In accordance with another aspect of the present invention, a method of wagering is provided. The method includes enabling a plurality of bettors to each place at least one wager regarding an event to be conducted in the future, wherein the wager is based on a prediction of an outcome of the event. The plurality of bettors is further enabled to each individually select at least one predicted aspect of the outcome of the event. At least one other predicted aspect of the outcome of the event is randomly selected for each bettor's at least one wager. Subsequent to an actual occurrence of the event, the player predicted aspect and the randomly selected aspect are compared to the actual outcome of the event. The event may be conducted by those administering the wager, such as a racing venue, or may be conducted by another party and simply monitored by those administering the wager.

In accordance with yet another embodiment of the present invention, a system is provided for conducting a pari-mutuel wager. The system includes a computer having at least one processor and at least one memory device. An input device is configured to receive at least one selection of from each of a plurality of bettors regarding at least one predicted aspect of an outcome of an event. The computer is configured to randomly select at least another predicted aspect of the outcome of the event and combine the player predicted aspect and the randomly predicted aspect to form a wager regarding an actual outcome of the event. For example, the computer may utilize a random number generator to select or generate the randomly predicted aspect of the wager.

In accordance with a further aspect of the present invention, a network is provided. The network includes a plurality of wagering systems operably coupled with each other. At least one of the wagering systems includes a computer having at least one processor and at least one memory device. An input device is configured to receive at least one selection from each of a plurality of bettors regarding at least one predicted aspect of an outcome of an event. In one embodiment, the computer is configured to randomly select at least one other predicted aspect of the outcome of the event and combine the player predicted aspect and the randomly predicted aspect to form a wager regarding an actual outcome of the event. The network may include, for example a random number generator, either in a host computer or in a resident computer associated with the network, to select or generate the randomly predicted aspect of the wager.

In accordance with yet another aspect of the invention, another method of conducting a wagering activity is provided. The method includes providing at least one event upon which a plurality of bettors may each place at least one wager and enabling each bettor of the plurality to provide input regarding a first portion of their respective at least one wager prior to the at least one event. Additionally, each bettor of the plurality is enabled to provide input regarding at least a second portion of the respective at least one wager prior to the at least one event upon payment of specified value. At least one other portion of each bettor's at least one wager is randomized prior to the event.

In accordance with yet a further aspect of the present invention, another method of conducting a wagering activity is provided. The method includes providing a first event upon which a plurality of bettors may each place at least one wager and enabling each bettor of the plurality to provide input regarding at least one portion of their respective at least one wager prior to the first event. At least one other portion of each bettor's at least one wager is randomized prior to the event. A first wager pool is compiled that comprises any wager placed by the plurality of bettors on the first event and a tiered payout structure is provided including at least a first prize of a first value and at least one second prize of a second value different from the first. The method further includes providing a second event upon which the plurality of bettors may each place at least another wager and enabling each bettor of the plurality to provide input regarding at least one portion of their respective at least another wager prior to the second event. At least one other portion of each bettor's at least one wager of the second event is randomized prior to the event. A second wager pool is compiled that comprises any wager placed by the plurality of bettors on the second event and a remainder of the first wager pool that comprises an amount not awarded under the tiered payout structure.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 2 is a table showing an exemplary tiered prize structure in accordance with an embodiment of the present invention;

FIG. 3 is a table showing another exemplary tiered prize structure in accordance with another embodiment of the present invention;

FIG. 4 is a table showing potential variations of prize structures in accordance with embodiments of the present invention.

DETAILED DESCRIPTION OF THE INVENTION

The present invention is directed to a method of wagering, particularly pari-mutuel type wagering, wherein the pool (the combination of wagers placed for a given wagering activity) consists of partially random wagers where the bettors provide an input regarding or, maintain a specific degree of control over, the wagers. Such partially random wagers may include, for example, wagers comprising a player selected portion and a portion selected through a random method beyond the control of the bettor. Specific examples of such partially random wagers are set forth in greater detail below herein.

As discussed hereinabove, in conventional pari-mutuel wagering activities, the jackpot is inversely related to the ability of the bettor population to predict the outcome of a given event or series of events. Because the predictability of events varies considerably from one event to another, a pari-mutuel venue has little control over the jackpots offered in association with such events. The presently disclosed methods of wagering serve to create substantial jackpots on a more predictable basis due to the random component of such wagering methods. The component of randomness helps an establishment to operate on a more predictive model since the jackpots are no longer dependent solely on the ability of the bettor population to predict the outcome of an event.

In an exemplary embodiment of the present invention, a plurality of events, such as dog or horse races (referred to hereinafter as "races" for purposes of convenience), may be conducted. Such races may occur in relatively rapid succession and may be ran at a plurality of tracks or venues wherein races may be monitored from one track to another through an appropriate network or broadcast system as will be appreciated by those of ordinary skill in the art. A wagering activity may include, for example, selecting, through a combination bettor selection and random selection, the winning contestants or runners of the plurality of races. In one particular embodiment, there is at least one mandatory bettor selection and at least one mandatory random selection, although other combinations of bettor and random selections are contemplated as set forth hereinbelow and as will be appreciated by those of ordinary skill in the art.

Figure 1:
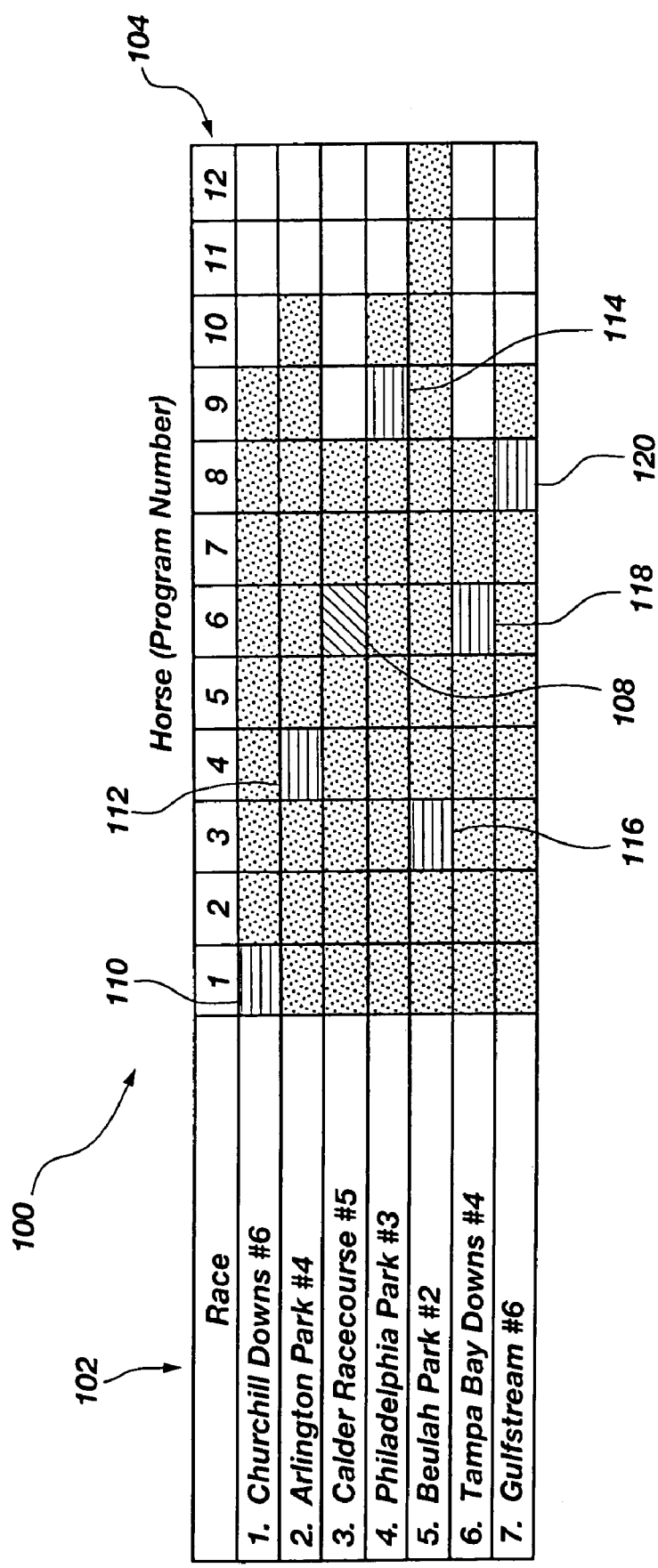
FIG. 1 is a schematic of a sample interface for conducting wagering activity in accordance with one embodiment of the present invention.

For example, the wagering activity may include seven specified races that may have been previously identified by the administrator of the wagering activity. A bettor may pay a specified amount to participate in the wagering activity and then select a runner of one race, in accordance with his or her predictions or handicapping activities, while a runner is randomly selected from each of the remaining six races. An exemplary interface 100 for such a wager is shown in FIG. 1. The exemplary interface 100 lists the seven races 102 that comprise the wagering activity, as well as an associated list of runner numbers 104 for each race, as generally indicated by darkened cells or runner locations. The exemplary interface 100 further shows that, of the seven specified races 102, the bettor selected runner number six (6) to win the third race (Calder Racecourse #5) as indicated by the diagonally hatched runner location at 108.

With regard to the remaining races, runners are selected at random, such as through the use of a computer with a random number generator, to complete the bettors wager. The randomly selected runners are indicated by horizontal hatching on the exemplary interface 100. Thus, runner number one (1) of the first race (Churchill Downs #6), runner number four (4) of the second race (Arlington Park #4), runner number nine (9) of the fourth race (Philadelphia Park #3), runner number three (3) of the fifth race (Beulah Park #2), runner number six (6) of the sixth race (Tampa Bay Downs #4) and runner number eight (8) of the seventh race (Gulfstream #6) as indicated by runner locations 110, 112, 114, 116, 118 and 120 respectively, were all selected by random means without bettor control or input. The complete wager comprises both the bettor selected portion (i.e., runner number six in the third race) and the randomly selected portion.

It is noted that in one embodiment, the bettor may only be allowed to pick or select a single outcome (e.g., runner number six in the third race) while requiring the remaining selections to occur randomly. In another embodiment, the bettor may be allowed to make several picks or selections. For example, a bettor may be allowed to select a second pick upon payment of a premium of, for example, a wager amount equal to the amount tendered to make the first bettor selection. Similarly, a bettor might be allowed to make a number of selections, up to a maximum number established by the operator of the event, upon payment of specified premiums. In another embodiment, additional picks may be afforded to a bettor without the payment of a premium. In such an embodiment, the number of bettor selections may be specified (e.g., three bettor selections) for a given event or a range of allowable selections may be specified (e.g., one to four bettor selections) for a given event.

Referring now to FIG. 2, a tiered prize structure 140 is shown that may be used in conjunction with the wagering methods described with respect to FIG. 1. The exemplary prize structure 140 is based on the exemplary assumptions of an average field size (e.g., the average number of runners or participants in the selected events) being 8.2, a selection bias of 30% (meaning that player selected portions of a wager are correct 30% of the time), a ticket price (or required wager amount) of $2.00 with 1,744,998 individual wagers being made, a take-out of 15% of the collected wagers being allocated to the administrator of the wagering activity and a top tier jackpot allocation of 15% of the collected wagers. Additionally, the prize structure 140 is based on the assumption that criteria for the winning event is the selection of a winning participant for a given race (rather than, for example, a show or place wager).

Based on these assumptions, and considering an exemplary wagering activity comprising seven races wherein the bettor is allowed to make a single selection, a wager that results in seven correct selections out of a possible seven races (only one such wager is expected in the present scenario) would be paid a first tier jackpot of $444,974.56. The wager that results in six correct selections out of a possible seven, (57 of such wagers would be expected in the presently considered scenario) would each be paid $5,168.11. The exemplary prize structure 140 continues with prizes or jackpots being awarded to bettors whose wagers result in as few as three correct selections out of a possible seven (158,243 of such wagers would be expected in the presently considered scenario) wherein each such wager would be paid $4.69.

In situations where the jackpot of a given tier is not won because, for example, the betting pool is too small for the price model, the jackpot may be carried over into, for example, another multi-race wagering activity. In another embodiment, jackpots not won (in any tier, not just the highest tier) may be rolled down to one or more designated lower tier levels and distributed, for example, pari-mutuelly, thereby providing an unanticipated bonus to participants with winning wagers in such designated lower tiers. In yet another embodiment, jackpots that are not won may be rolled forward to another event with a cap being placed on the amount that may be rolled forward so that, eventually, all or part of the unrealized jackpot money is rolled down to designated tiers when such a cap is reached.

Of course, the exemplary embodiments described with respect to FIGS. 1 and 2 need not follow either the exemplary assumptions set forth herein or the exemplary tiered prize structure 140. Rather, variables, such as the take-out, jackpot allocation, number of total events (e.g., races), number of player selections allowed, average field size, win criteria (e.g., win, place, show), number of tiers and other variables may be altered and different prize structures may be utilized. Using such variables, one of ordinary skill in the art may compute the various odds of winning a specified wagering event and provide a corresponding prize structure. It is further noted that the above exemplary embodiments readily provide scalability. Thus, the present method may be tailored to individual venues depending, for example, on the number of patrons attending a given event and the expected level of participation by the patrons in the wagering activity.

Referring to FIG. 3, another exemplary prize structure 142 is shown that may be used in association with the presently disclosed invention, the prize structure 142 being modeled for administration of multiple such wagering activities over an extended period of time. The exemplary prize structure 142 is based on the exemplary assumptions of an average field size being 8.2, a selection bias of 30%, a ticket price of $1.00 with 500,000,000,000 individual wagers being made over an extended period of time (contemplating 517,935,000 individual wagers being made annually, with tickets being sold fifty weeks out of the year), a take-out of 25% of the collected wagers being allocated to the administrator of the wagering activity and a top tier jackpot allocation of approximately 5.6% of the collected wagers. Additionally, the prize structure 140 is based on the assumption that criteria for the winning event is the selection of a winning participant for a given race (rather than, for example, a show or place wager).

It is noted that the prize structure 142 shows the ability of the present method to be conducted over an extended period of time. With jackpots potentially rolled forward from one event to another, as discussed hereinabove, the prize structure 142 contemplates that a jackpot awarded during one particular event may be partially funded from wagers placed in association with another event. Thus, based on the above-stated assumptions, the prize structure 142 sets forth anticipated prize payouts (or liability of an establishment) over a significant period of time, while also set forth the anticipated exposure of an establishment during a specified cycle of activity such as, for example, a year, a week, or a cycle of some other specified time period. The ability to make such long terms forecasts while also determining more immediate exposure provides a significant tool for an establishment that is conducting or facilitating such wagering events. For example, the prize structure 142 shows that the anticipated number of winners of the Tier 1 jackpot or prize for a given week is 0.02 or, assuming fifty events are conducted in a year, one winner is expected per year at this level.

More specifically, based on the above-stated assumptions, and considering an exemplary wagering activity comprising ten races wherein the bettor is allowed to make a single selection, a wager that results in ten correct selections out of a possible ten races (nearly 895 winning wagers are expected over the extended course of administration in the present scenario) would be awarded a share of a first tier jackpot of $20,996,250,000.00, each share being $23,462,546.57. The wager that results in nine correct selections out of a possible ten, (60,076.02 of such wagers would be expected in the presently considered scenario over the extended administration of such an event) would each be paid $88,262.43 (from a pool of $5,302,500,000.00). The exemplary prize structure 142 continues with prizes or jackpots being awarded to bettors whose wagers result in as few as four correct selections out of a possible ten (15,562,957,573.18 of such wagers would be expected over the extended administration of the event in the presently considered scenario) wherein each such wager would be paid $16.55.

It is noted that in the prize structure 142, each "Tier" includes two rows, one associated with 350,000,000,000 tickets and one associated with 150,000,000,000 tickets. The individual rows are used to take into account the separate odds of obtaining the requisite number of matches in a given tier (e.g., Tier 2, nine correct selections or matches) when a bettor's selection is correct, as well as the odds of getting the correct number of matches in a given tier solely based on random selections (i.e., the bettor's selection was incorrect). In other words, the separate rows allow probabilities to be determined while factoring in the assumed hit rate for bettors' handicapping efforts (e.g., 30% for the exemplary prize structure 142).

Additionally, it is noted that the prize structure 142 includes a column designated as "Odds" and another column designated as "Adjusted Odds." The Odds represent the possibility of obtaining a single particular match for the given Tier based on the foregoing assumptions. The Adjusted Odds reflect the probability of obtaining a match while factoring in the number of possible matching combinations as set forth in the column designated "Combinations." Finally, in the Adjusted Odds column, the resulting or "combined" odds is listed beneath the second row of a given Tier and represents an effective combination of Adjusted Odds for the given Tier, essentially setting forth the overall odds of winning in the given Tier (regardless of whether a bettor selection is correct or not) based on the number of expected winners and the number of ticket sales or total wagers.

It is noted that the prize structures 140 and 142 described herein are exemplary of the present invention and that implementation of any given prize structure would be in accordance with the underlying probabilities based on specified assumptions. The probabilities of a given prize structure may be calculated by one of ordinary skill in the art in accordance with the assumptions set forth for a given event.

In an exemplary method of calculating the probabilities associated with a prize structure, the number of events or races may be represented by n, the average number of runners in a given race may be represented by r, with p=1/r. Additionally, the hit rate, or expected rate of a bettor's selection being correct, may be represented by $p_o$. The probability of n matches may then be determined by the following equation:

$$P\{\text{match } n\} = p_o p^{n-1}$$

wherein the equation contemplates that all races were selected correctly, including the bettor's selection.

The probability of k matches being selected correctly, wherein 1<k<n−1, may then be determined by the following equation:

$$P\{\text{match } k\} = p_0 \binom{n-1}{k-1} p^{k-1}(1-p)^{n-k} + (1-p_0)\binom{n-1}{k} p^k (1-p)^{n-1-k}$$

wherein $$\binom{n-1}{k-1} \text{ and } \binom{n-1}{k}$$

are binomial coefficients as will be appreciated by those of ordinary skill in the art.

It is noted that P{match k} contemplates the fact that an appropriate match may or may not include a correct bettor selection. In other words, considering k to equal five and n to equal ten, the five correct selections may include one correct bettor selection with four correct random selections, or it may include an incorrect bettor selection and five correct random selections.

Finally, it is noted that the probability of no matches occurring is set forth by the following equation:

$$P\{\text{match } 0\}=(1-p_o)(1-p)^{n-1}$$

wherein all selections, including the bettor's selection, are incorrect.

Referring briefly to FIG. 4, a comparison is shown of various potential structures that may be used to conduct a wagering event or a plurality of wagering events. In essence, FIG. 4 shows potential jackpots or prizes that may be implemented given a specified number of correct matches for a specified event (e.g., seven races, eight races, etc.) and depending on the number of prize tiers desired for the specified event. FIG. 4 shows the flexibility of the present method of wagering in its ability to provide prize structures that are attractive and enticing to bettors while accommodating a variety of event parameters. Again, such potential jackpots are exemplary and are dependent, in large part, on the underlying assumptions and associated probabilities of a given prize structure.

The presently disclosed method, when appropriately implemented, can generate overall odds of winning that are superior to conventional pari-mutuel wagering. Such a method can provide bettors with a greater win frequency than currently enjoyed, thus, creating more "churn" that will be reinvested into the event as additionally placed wagers.

Additionally, in providing a wager that includes a partially random selection, numerous advantages are provided to the administrator of the wagering activities. First of all, large jackpots may be created to encourage participation by a substantial number of patrons. Additionally, partial random selection provides increased jackpot predictability. Instead of allowing wagers wherein an unknown number of the wagers are handicapped (thereby resulting in unpredictable jackpots from one race to another), the administrator will have a considerable amount of control over the jackpots being offered.

Furthermore, such a method enables the administrator to offer a greater number of tiered jackpots for added enticement of wagering by the patrons. Moreover, the present invention provides simplification with regard to handicapping the selection of runners. For example, if a bettor does not have adequate resources (time, access to past performances, etc.) to handicap all of the races of a given wagering activity, he or she can focus on a single race or on a subset of runners to determine the bettor selected portion of the wager. This allows the bettor to participate without being at a disadvantage relative to those who have access to the resources necessary for handicapping all of the races.

Another exemplary embodiment of the present invention may include a wagering activity structure such that the entire betting pool comprises wagers wherein the bettor selects one or more runners and wherein one or more runners are randomly selected for a single race. For example, a bettor may place a conventional "win" wager selecting runner number five (5) of a given race. The bettor may also place a separate wager for a separate pool wherein the bettor selects runner number five (5) as the winning participant, and wherein a plurality of other runners (e.g., three) are randomly chosen to finish, for example, in the second, third and fourth positions. The additional wager thus comprises the player selected runner to win, combined with the randomly selected runners, to form a "superfecta" type wager. If the bettor's wager matches all, or a portion, of the actual order of finish, the bettor may be paid a prorated prize that is determined by the portion of the prize pool apportioned to a specified tier and the number of winning wagers that are classified with that specified tier. Such a method enables patrons to compete for a larger jackpot pool than may be available in a conventional superfecta wager. Such a method also enables the implantation of partially random wagering without the need to conduct multiple races or events such that the wagering activity is readily carried out at a single venue in a relatively short period of time.

In accordance with yet another exemplary embodiment of the present invention, a method of conducting a wagering activity may enable a bettor to completely select the runners of a given race, while randomizing the selected or predicted outcome based on the selected runners. In other words, rather than randomizing the selection process, the outcome becomes at least partially randomized. For example, after placing a conventional "win" wager, a bettor may elect to enhance their wager by adding further monetary value to the wager and then selecting a plurality of numbers for the enhanced or bonus portion of the wager. After completion of the race, a random selection of numbers occurs as a bonus event for those who have chosen to enhance their wager.

The random selection of numbers may be lottery style, wherein individual ping-pong balls, each carrying indicia of a number, are randomly ejected from an apparatus containing a pool of such ping-pong balls. In another embodiment, the names of jockeys may be randomly selected wherein each jockey name is associated with a different number, such as the program number assigned to the horse ridden by the jockey in the most recent race. Of course other methods of randomly selecting numbers, and indicia other than numbers, may be used as will be appreciated by those of ordinary skill in the art.

In a further embodiment of the present invention, a wagering activity may be conducted wherein the bettor controls the selection of runners while the finishing order of the selected runners is randomly assigned. Thus, for example, a bettor may select runners two (2), five (5), six (6) and seven (7) for a superfecta type wager. The selection of those runners is then at least partially randomly ordered. In an embodiment where the ordering is partially random, the bettor may be allowed, for example, to select the winner, and the second through fourth place finishers will then be randomly ordered. In an embodiment where the ordering is completely random, the bettor has no control or input with regard to which runner will finish in which position. Thus, using the example set forth above wherein runners two (2), five (5), six (6) and seven (7) are selected by the bettor, a superfecta wager my be placed wherein the bettor may specify runner six (6) to be the winner, and wherein the remaining selected runners (i.e., two, five and seven) are randomly ordered as finishing in second, third or fourth place. In the example of forming a superfecta wager with completely random ordering, twenty-four different random combinations may be assigned for each unique selected group of four runners by a bettor. It is noted that other types of wagers (e.g., perfecta, superfecta, quinella, etc.) may similarly be implemented with such a method.

In yet a further embodiment of the present invention, a wagering activity may be conducted wherein the selection of runners is at least partially random, but wherein the ordering of the selected runners is determined by the bettor. For example, upon placing of a trifecta wager, the runners two (2), three (3) and eight (8) may be randomly selected, such as by a computer using a random number generator. The bettor may then order the randomly (or partially randomly) selected runners according to his or her prediction of how the selected runners will finish the race. Thus, the bettor may, for example, select runner eight (8) to finish first, runner two (2) to finish second, and runner three (3) to finish third. In another embodiment the bettor may be allowed to have partial input regarding the selection of runners. It is noted that other types of wagers (e.g. perfecta, superfecta, quinella, etc.) may be also be implemented with such a method as may be desired.

In accordance with yet another embodiment of the present invention, a wagering activity may be conducted wherein both the selection of runners and the ordering thereof are partially random. Thus, a player may select at least one runner and at least one other runner may then be randomly selected. After selection of all the runners, at least one of the selected runners is placed in a finishing order by the bettor and at least one other runner is randomly placed in a finishing order. In one embodiment, the bettor may be allowed to make his or her selections and/or ordering determinations prior to the random selections and assignments. In another embodiment the random selections and/or assignments may be made prior to any bettor input.

Figure 5:
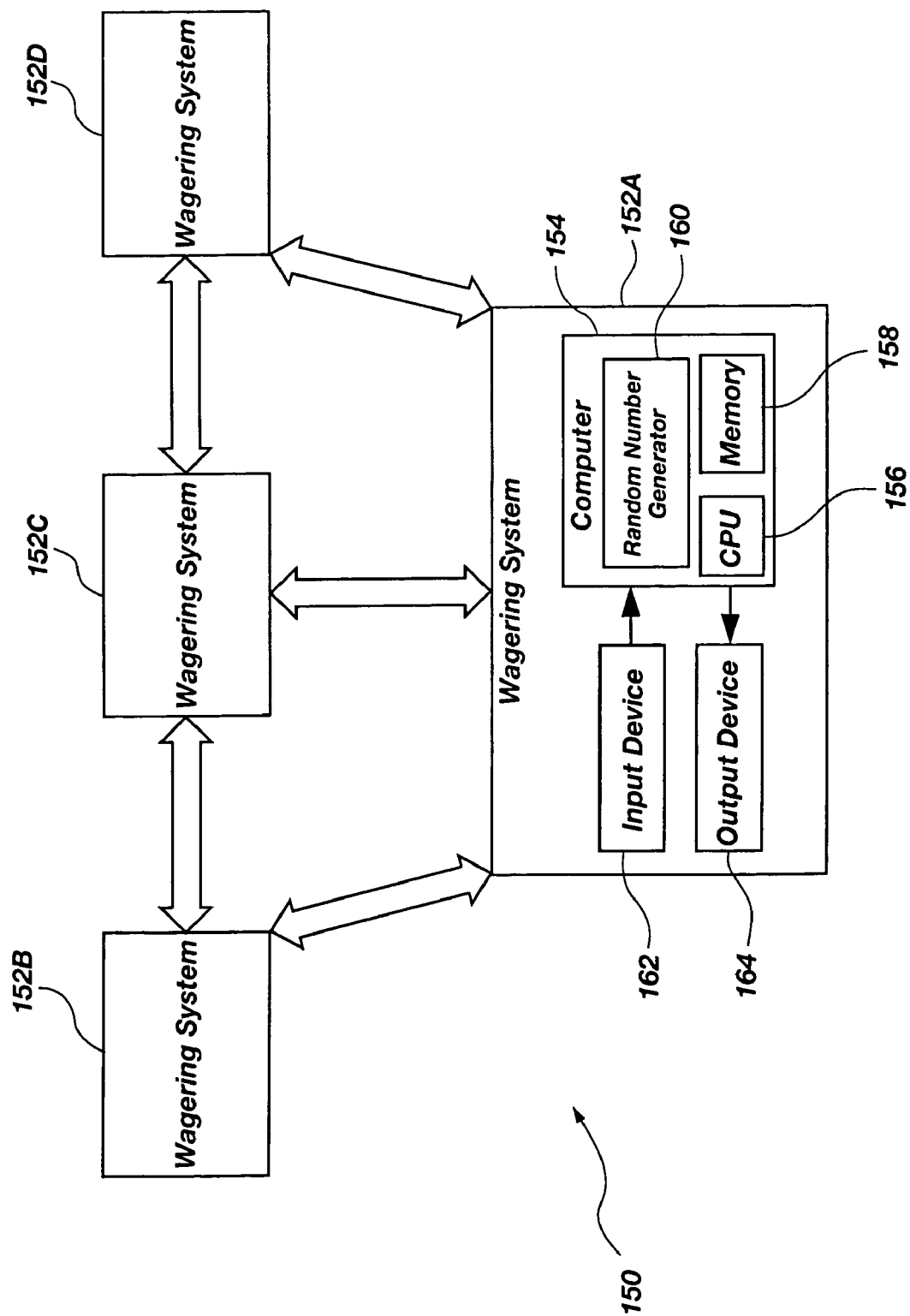
FIG. 5 is a schematic of a wagering system and network that may be used in accordance with an aspect of the present invention.

Referring now to FIG. 5, a network 150 for conducting pari-mutuel wagers may include a plurality of systems 152A-152D, which are operably coupled to one another. Each system may include, for example, a computer 154 with a central processing unit (CPU) 156 or other processing device and associated memory 158. Each computer 154 may be configured to act as a random number generator 160 for random selection of one or more predicted aspects of an outcome of an event. An input device 162 may be coupled with the computer 154 for bettor input regarding another predicted aspect of an outcome of an event. The input device 162 may further include a device for accepting a monetary value associated with a wager wherein the device may include, for example, a coin collector, a bill collector or a card reader. An output device 164 may also be coupled with the computer and configured, for example, to display the resulting combination of the bettor selected prediction and randomly selected prediction, which forms a wager. Such an output device 164 may include, for example, a visual display and or a printing device. Additionally, such an output device 164 may be configured to display the results of an event taking place at a remote venue. Thus, for example, a first system 152A may be located at a first venue while another system 152D may be located at a second remotely located venue. Thus, the network formed of the plurality of systems 152A-152D may enable wagering on, and monitoring of, events at multiple venues substantially simultaneously if so desired. In another embodiment, the systems 152A-152D may be located in a single venue where, for example, a first system 152A acts as a server while other systems 152B-152D act as terminals coupled with the server.

In sum, the present invention contemplates methods and systems of conducting wagers, such as pari-mutuel wagers. In one exemplary embodiment, an event, such as a horse race, dog race, etc., is identified for which a plurality of bettors may each place at least one wager. Each bettor of the plurality is enabled to provide input regarding at least one portion of their respective at least one wager prior to the event. At least one other portion of each bettor's at least one wager is randomized prior to the event. The wager then comprises the combination of the bettor selected portion and randomized portion. Stated another way, the bettors are enabled to each individually select at least one predicted aspect of an outcome of the event while at least one other predicted aspect of the outcome of the event is randomly selected. Again, the resultant wager is the combination of the bettor selected aspect, or aspects, and the randomly selected aspect, or aspects, of the event's outcome.

It is noted that numerous techniques may be employed in practicing the present invention. For example, while the above exemplary embodiments have been discussed in terms of races with runners or participants, the present invention may incorporate wagering activities on other events. Also, while randomization has been discussed herein in terms of an exemplary random number generator, other techniques may be used including, for example, the use of lottery-style ping-pong ball systems. Moreover, while the exemplary embodiments have been discussed in terms of predicting the winner or the finishing order of a race or other event, the predicted aspects (either player selected or randomly selected) may include, for example, interim times, finish times or interim ranks of the various participants of an event. Thus, the present invention is flexible in terms of its application to events and predicted aspects of such events.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of conducting a wagering activity, the method comprising:
providing at least one event upon which a plurality of bettors may each place at least one wager within a wager pool over a gaming system;
requiring each bettor of the plurality to provide input regarding a first portion of each bettor's at least one wager prior to the at least one event with an input device coupled to the gaming system;
requiring each bettor of the plurality to provide input regarding at least a second portion of each bettor's at least one wager prior to the at least one event with the input device upon payment of a specified value separate and in addition to a value of the least one wager amount;
randomizing at least one other portion of each bettor's at least one wager prior to the event using a random number generator; and
maintaining the wager pool to consist of wagers each having the at least one randomized portion.

2. The method according to claim 1, wherein requiring each bettor of the plurality to provide input regarding a first portion of each bettor's at least one wager further includes requiring each bettor to select at least one participant of the at least one event.

3. The method according to claim 2, wherein requiring each bettor of the plurality to provide input regarding at least a second portion of each bettor's at least one wager further includes requiring the each bettor to select at least one other participant of the event.

4. The method according to claim 2, wherein randomizing at least one other portion of each bettor's at least one wager further includes randomly assigning a predicted performance indicator to the at least one selected participant.

5. The method according to claim 4, wherein providing the at least one event upon which a plurality of bettors may each place at least one wager further includes conducting at least one race having a plurality of participants therein.

6. The method according to claim 5, wherein randomly assigning the predicted performance indicator includes randomly assigning an order in which the at least one selected participant will finish the at least one race using the random number generator.

7. The method according to claim 6, wherein requiring each bettor to select at least one participant of the at least one event further includes requiring each bettor to select a plurality of participants.

8. The method according to claim 7, wherein providing the at least one event upon which a plurality of bettors may each place at least one wager includes enabling each bettor of the plurality to place at least one of a perfecta, trifecta, superfecta or quinella wager.

9. The method according to claim 1, wherein providing the at least one event upon which a plurality of bettors may each place at least one wager includes conducting a plurality of races wherein each race of the plurality includes a plurality of participants.

10. The method according to claim 9, wherein requiring each bettor of the plurality to provide input regarding at least one portion of their respective at least one wager further includes selecting at least one participant of at least one race.

11. The method according to claim 10, wherein randomizing at least one other portion of each bettor's at least one wager further includes randomly assigning an order in which the at least one selected participant will finish its associated at least one race using the random number generator.

12. The method according to claim 10, wherein selecting at least one participant of at least one race further includes selecting a finishing order of the at least one participant of the at least one race.

13. The method according to claim 10, wherein randomizing at least one other portion of each bettor's at least one wager further includes randomly selecting at least one participant of at least one other race using the random number generator.

14. The method according to claim 10, wherein randomizing at least one other portion of each bettor's at least one wager further includes randomly selecting at least one other participant of the at least one race using the random number generator.

15. The method according to claim 10, wherein randomizing at least one other portion of each bettor's at least one wager further includes randomly selecting at least one other participant of at least one other race of the plurality of races using the random number generator.

16. The method according to claim 1, further comprising compiling a pool of wagers from the at least one wager of each of the plurality of bettors, removing a defined percentage of the pool of wagers and providing at least one jackpot from a remaining pool of wagers.

17. The method according to claim 16, wherein providing at least one jackpot further includes providing a tiered prize structure including at least a first prize of a first value and plurality of second prizes each of a second value different from the first value.

18. The method according to claim 17, wherein requiring each bettor of the plurality to provide input regarding a first portion of their respective at least one wager further includes requiring each bettor of the plurality to select at least one participant of the event and wherein randomizing at least one other portion of each bettor's at least one wager further includes randomly selecting at least one other participant of the event using the random number generator.

19. A method of conducting a wagering activity, the method comprising:
providing a first event upon which a plurality of bettors may each place at least one wager over a gaming system;
enabling each bettor of the plurality to provide input regarding at least one portion of their respective at least one wager prior to the first event with an input device coupled to the gaming system;
randomizing at least one other portion of each bettor's at least one wager prior to the event using a random number generator;
compiling a first wager pool comprising each bettor's at least one wager;
maintaining the first wager pool to consist of wagers each having at least one randomized portion;
providing a tiered payout structure including at least a first prize of a first value and at least one second prize of a second value different from the first value;
providing a second event upon which the plurality of bettors may each place at least another wager over the gaming system;
enabling each bettor of the plurality to provide input regarding at least one portion of their respective at least another wager prior to the second event with the input device;
randomizing at least one other portion of each bettor's at least another wager prior to the second event using the random number generator;
compiling a second wager pool comprising any wager placed by the plurality of bettors on the second event and a remainder of the first wager pool comprising an amount not awarded under the tiered payout structure; and
maintaining the second wager pool to consist of wagers each having at least one randomized portion.

20. The method according to claim 19, wherein providing a first event upon which a plurality of bettors may each place at least one wager includes providing at least one race having a plurality of participants and wherein providing the second event upon which the plurality of bettors may each place at least another wager further includes providing at least one other race having a plurality of participants.

* * * * *